(12) United States Patent
Hearn et al.

(10) Patent No.: US 8,980,376 B2
(45) Date of Patent: Mar. 17, 2015

(54) STORAGE STABLE EPOXY RESIN COMPOSITIONS FOR ELECTRICAL LAMINATES

(75) Inventors: Robert L. Hearn, Lake Jackson, TX (US); William E. Mercer, II, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 306 days.

(21) Appl. No.: 13/505,126

(22) PCT Filed: Oct. 8, 2010

(86) PCT No.: PCT/US2010/052023
§ 371 (c)(1),
(2), (4) Date: Apr. 30, 2012

(87) PCT Pub. No.: WO2011/056352
PCT Pub. Date: May 12, 2011

(65) Prior Publication Data
US 2012/0225212 A1    Sep. 6, 2012

Related U.S. Application Data

(60) Provisional application No. 61/258,858, filed on Nov. 6, 2009.

(51) Int. Cl.
| | | |
|---|---|---|
| *B32B 38/08* | (2006.01) | |
| *C08G 59/38* | (2006.01) | |
| *C09D 163/00* | (2006.01) | |
| *C09D 163/04* | (2006.01) | |
| *B05D 3/02* | (2006.01) | |
| *C08G 65/22* | (2006.01) | |
| *C08J 5/24* | (2006.01) | |
| *B32B 27/04* | (2006.01) | |
| *B32B 27/24* | (2006.01) | |
| *B32B 27/38* | (2006.01) | |
| *C08L 63/00* | (2006.01) | |

(52) U.S. Cl.
CPC . *B32B 38/08* (2013.01); *B05D 3/02* (2013.01); *C08G 59/38* (2013.01); *C08G 65/223* (2013.01); *C08J 5/24* (2013.01); *C09D 163/00* (2013.01); *C08J 2363/00* (2013.01); *C08L 63/00* (2013.01)
USPC ........ 427/386; 428/297.4; 428/413; 523/454; 523/456

(58) Field of Classification Search
USPC ............... 523/400, 454, 456; 428/413, 297.4; 427/386
See application file for complete search history.

(56) References Cited

U.S. PATENT DOCUMENTS

| | | |
|---|---|---|
| 4,550,128 A | 10/1985 | Chellis |
| 5,405,931 A | 4/1995 | Kohno et al. |
| 5,670,250 A | 9/1997 | Sanville, Jr. et al. |
| 6,245,696 B1 * | 6/2001 | Haas et al. ............... 442/348 |
| 6,333,064 B1 | 12/2001 | Gan |
| 6,361,923 B1 * | 3/2002 | Kresge et al. ............ 430/280.1 |
| 6,645,631 B2 | 11/2003 | Gan et al. |
| 2002/0119317 A1 | 8/2002 | Gan et al. |
| 2004/0247880 A1 | 12/2004 | Valette et al. |
| 2009/0081379 A1 | 3/2009 | Nawrocki et al. |
| 2009/0159313 A1 | 6/2009 | Valette et al. |

FOREIGN PATENT DOCUMENTS

| | | |
|---|---|---|
| EP | 0158915 | 10/1985 |
| EP | 0507271 A2 | 10/1992 |
| EP | 1418206 | 5/2004 |
| JP | 60038421 | 2/1985 |
| JP | 10168287 | 6/1998 |
| WO | 9831750 | 7/1998 |
| WO | 00/09581 A2 | 2/2000 |
| WO | 0076764 | 12/2000 |
| WO | 2008/051373 A2 | 5/2008 |

\* cited by examiner

*Primary Examiner* — Michael J Feely
(74) *Attorney, Agent, or Firm* — Whyte Hirschboeck Dudek S.C.

(57) ABSTRACT

Epoxy resin compositions that include an epoxy resin component that includes at least one epoxy resin and a solvent blend that includes methyl ethyl ketone and glycol methyl ether acetate are provided. The compositions are well-suited for use in the fabrication of prepregs and composite electrical laminates made therefrom.

10 Claims, No Drawings

STORAGE STABLE EPOXY RESIN COMPOSITIONS FOR ELECTRICAL LAMINATES

CROSS REFERENCE TO RELATED APPLICATION

This application claims priority to U.S. patent application No. 61/258,858 filed on Nov. 6, 2009, the entire content of which is incorporated by reference herein.

FIELD OF THE INVENTION

The present invention relates to compositions comprising epoxy resins and solvent blends that include a low boiling point solvent and a high boiling point solvent and further relates to pre-pregs and composite laminates made from the compositions.

BACKGROUND

Low viscosity mixtures of solvents and epoxy resins are used in the manufacture of electrical laminates. Unfortunately, some higher functional epoxies and highly brominated epoxies that are desirable for use in such mixtures are difficult to solubilize and, therefore, do not maintain solubility over long periods of time. This makes it difficult to manufacture, store, and ship resin solutions that include these types of epoxies.

BRIEF SUMMARY OF THE INVENTION

Epoxy resin compositions comprising an epoxy resin component comprising at least one epoxy resin and a solvent blend comprising methyl ethyl ketone in an amount of no greater than 30 weight percent and propylene glycol methyl ether acetate in an amount of at least 70 weight percent, based on the total weight of the solvent blend are provided. The compositions have an epoxy resin content of at least 70 weight percent, based on the solids content of the composition and a storage stability of at least 130 days at 21° C. For example, the composition can have an epoxy resin content of at least 85 weight percent, based on the solids content of the composition, and a storage stability of at least 200 days at 21° C.

In one embodiment of the compositions, the solvent blend comprises from 75 to 85 weight percent propylene glycol methyl ether acetate and from 15 to 25 weight percent methyl ethyl ketone. The composition of this embodiment can have an epoxy resin content of at least 80 weight percent.

In one embodiment the composition has an epoxy resin content of at least 75 weight percent, based on the solids content of the composition, and a storage stability of at least 150 days at 21° C. and the solvent blend comprises no greater than about 25 weight percent methyl ether ketone and at least 75 weight percent propylene glycol methyl ether acetate.

In one embodiment of the compositions, the epoxy resin component comprises a brominated epoxy resin and a functionalized epoxy resin. In this embodiment, the composition can have an epoxy resin content of at least 85 weight percent, based on the solids content of the composition, and a storage stability of at least 200 days at 21° C. and the solvent blend can contain from 75 to 85 weight percent propylene glycol methyl ether acetate and from 15 to 25 weight percent methyl ethyl ketone.

Varnishes comprising a curing agent, a curing catalyst and an epoxy resin composition are also provided. The epoxy resin compositions in the varnishes include at least one epoxy resin and a solvent blend comprising methyl ethyl ketone in an amount of no greater than 30 weight percent and propylene glycol methyl ether acetate in an amount of at least 70 weight percent, based on the total weight of the solvent blend. The compositions have an epoxy resin content of at least 70 weight percent, based on the solids content of the composition and a storage stability of at least 130 days at 21° C. In one embodiment the varnish has a viscosity of no greater than 4000 cPs at 25° C.

Methods for forming a composite are also provided. The methods include impregnating a porous reinforcement material with a varnish and at least partially curing the impregnated fibrous reinforcement material, the varnish comprising a curing agent, a curing catalyst and an epoxy resin composition, as described herein.

DETAILED DESCRIPTION OF THE PREFERRED EMBODIMENT

One aspect of the invention provides epoxy resin compositions that include an epoxy resin component that includes at least one epoxy resin and a solvent blend that includes methyl ethyl ketone (MEK) and glycol methyl ether acetate (PMA). The compositions are well-suited for use in the fabrication of pre-pregs and composite electrical laminates made therefrom. By employing these particular solvents in an appropriate ratio, the inventors have discovered that compositions characterized by high solids content, low viscosity and long-term storage stability can be formulated. High solids content is advantageous because it reduces the energy requirement for waste solvent incineration associated with the production of electrical laminates. A low viscosity is desirable because it allows the compositions to wet and be absorbed into fibrous reinforcement materials used in pre-pregs and electrical laminates. The long-term storage stability of the compositions facilitates the manufacturing, shipping and storage of the compositions under a wide range of conditions.

In addition to making the above-stated properties achievable, the solvent blend of the present compositions also affects the solvent removal process during pre-preg processing, resulting in improved surface appearance for the pre-preg. Specifically, the right combination of low and high boiling point solvents allows for a stepwise removal of solvents during the B-staging process. As the low boiling solvent is removed and the prepreg is beginning to cure, enough high boiling solvent remains in the prepreg to keep the viscosity and surface tension sufficiently low to allow for the removal of air from the prepreg without leaving bubbles or craters behind which can cause a rough surface on the final B-staged material. It is desirable to have prepreg with a smooth surface to facilitate even resin distribution during the C-stage or pressing process.

Epoxy Resin Component:

The epoxy resin component of the compositions includes at least one epoxy resin, and in some embodiments includes a blend of two or more epoxy resins. Epoxy resins are those compounds containing at least one vicinal epoxy group. The epoxy resin can be saturated or unsaturated, aliphatic, cycloaliphatic, aromatic or heterocyclic and can be substituted. The epoxy resin can be monomeric or polymeric.

In some embodiments, the epoxy resin component can include a polyepoxide. Polyepoxide refers to a compound or mixture of compounds containing more than one epoxy moiety. Polyepoxides include partially advanced epoxy resins that is, the reaction product of a polyepoxide and a chain extender, wherein the reaction product has, on average, more than one unreacted epoxide unit per molecule. Aliphatic polyepoxides may be prepared from the reaction of epihalohydrins and polyglycols. Other specific examples of aliphatic epoxides include trimethylpropane epoxide, and diglycidyl-1,2-cyclohexane dicarboxylate. Other compounds include, epoxy resins such as, for example, the glycidyl ethers of polyhydric phenols (that is, compounds having an average of more than one aromatic hydroxyl group per molecule).

In some embodiments, the epoxy resins used in the epoxy resin component of the present compositions includes at least one halogenated or halogen-containing epoxy resin compound. The solvent blends in the present compositions are well-suited for use with highly halogenated (e.g., highly brominated) epoxy resins because they are able to solubilize these difficult-to-solubilize resins and provide and maintain them in solution for long periods. Thus, in some embodiments halogenated epoxy resins of the present compositions can have a halogen content of at least 35 weight percent, at least 45 weight percent, or even at least 55 weight percent.

Halogen-containing epoxy resins are compounds containing at least one vicinal epoxy group and at least one halogen. The halogen can be, for example, chlorine or bromine, and is preferably bromine. Examples of halogen-containing epoxy resins useful in the present invention include diglycidyl ether of tetrabromobisphenol A and derivatives thereof. Examples of brominated epoxy resins useful in the present invention include commercially available resins such as the D.E.R.™ 500 series (e.g., D.E.R. 560 and D.E.R. 542), commercially available from The Dow Chemical Company.

The halogen-containing epoxy resin may be used alone, in combination with one or more other halogen-containing epoxy resins, or in combination with one or more other different non-halogen-containing epoxy resins. The ratio of halogenated epoxy resin to non-halogenated epoxy resin can be chosen to provide flame retardancy to the present compositions. The weight amount of halogenated epoxy resin in the compositions can vary depending upon the particular chemical structure used (due to the halogen content in the halogenated epoxy resin). It also depends on the fact that other flame retardants might be present in the composition, including a curing agent and optional additives.

In one embodiment, the ratio of halogenated epoxy resin to non-halogenated epoxy resin used in the composition of the present invention is such that the total halogen content in the composition is between 2 percent and 40 percent by weight based on solids (excluding fillers), preferably between 5 percent and 30 percent, and more preferably between 10 percent and 25 percent. In another embodiment, the ratio of halogenated epoxy resin to non-halogenated epoxy resin used in the composition of the present invention is between 100:0 and 2:98 by weight, preferably between 100:0 and 10:90, more preferably between 90:10 and 20:80. In another embodiment, the ratio of halogenated epoxy resin to non-halogenated epoxy resin used in the composition of the present invention is such that the total halogen content in the epoxy resin is between 2 percent and 50 percent by weight based on solids, preferably between 4 percent and 40 percent, and more preferably between 6 percent and 30 percent.

The epoxy resin compounds, other than the halogen-containing epoxy resin utilized in the compositions can be, for example, a functionalized epoxy resin or a combination of functionalized epoxy resins. For example, functionalized epoxy resins can be prepared from an epihalohydrin and a phenol or a phenol type compound.

In one embodiment, the epoxy resins utilized in the compositions of the present invention include those resins produced from an epihalohydrin and a phenol or a phenol type compound. The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (that is the reaction product of phenols and simple aldehydes, such as formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof. Specifically, phenol type compounds include resorcinol, catechol, hydroquinone, bisphenol A, bisphenol AP (1,1-bis(4-hydroxyphenyl)-1-phenyl ethane), bisphenol F, bisphenol K, tetrabromobisphenol A, phenol-formaldehyde novolac resins, alkyl substituted phenol-formaldehyde resins, cresol-hydroxybenzaldehyde resins, dicyclopentadiene-phenol resins, dicyclopentadiene-substituted phenol resins, tetramethylbiphenol, tetramethyltetrabromobiphenol, tetramethyltribromobiphenol, and tetrachlorobisphenol A.

Examples of bisphenol A based epoxy resins useful in the epoxy resin component include commercially available resins such as the D.E.R.™ 300 series and D.E.R.™ 600 series, commercially available from The Dow Chemical Company. Examples of epoxy novolac resins useful in the compositions include commercially available resins such as the D.E.N.™ 400 series (e.g., D.E.N. 438 and D.E.N. 439), commercially available from The Dow Chemical Company. The solvent blends in the present compositions are well-suited for use with higher functionalized epoxy resins because they are able to solubilize these difficult-to-solubilize resins and provide and maintain them in solution for long periods. Thus, in some embodiments the functionalized epoxy resins of the present compositions can have a functionality of at least 1.5, at least 3, or even at least 6.

In some embodiments, the epoxy resins utilized in the epoxy component include those resins produced from an epihalohydrin and an amine. Suitable amines include diaminodiphenylmethane, aminophenol, xylene diamine, anilines, or combinations thereof.

In some embodiments, the epoxy resins utilized in the epoxy component include those resins produced from an epihalohydrin and a carboxylic acid. Suitable carboxylic acids include phthalic acid, isophthalic acid, terephthalic acid, tetrahydro- and/or hexahydrophthalic acid, endomethylenetetrahydrophthalic acid, isophthalic acid, methylhexahydrophthalic acid, or combinations thereof.

In some embodiments the epoxy resin is an advanced epoxy resin which is the reaction product of one or more epoxy resins, as described above, with one or more phenol type compounds and/or one or more compounds having an average of more than one aliphatic hydroxyl group per molecule. Alternatively, the epoxy resin may be reacted with a carboxyl substituted hydrocarbon, which is a compound having a hydrocarbon backbone, preferably a $C_1$-$C_{40}$ hydrocarbon backbone, and one or more carboxyl moieties, preferably more than one, and most preferably two. The $C_1$-$C_{40}$ hydrocarbon backbone can be a straight- or branched-chain alkane or alkene, optionally containing oxygen. Fatty acids and fatty acid dimers are among the useful carboxylic acid substituted hydrocarbons. Included in the fatty acids are caproic acid, caprylic acid, capric acid, octanoic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

In some embodiments, the epoxy resin is the reaction product of a polyepoxide and a compound containing more than one isocyanate moiety or a polyisocyanate. For example, the epoxy resin produced in such a reaction can be an epoxy-terminated polyoxazolidone.

In one specific embodiment, the epoxy resin component is a blend of a brominated epoxy resin and a phenolic novolac epoxy resin.

The present compositions are desirably high-solids compositions. Therefore, in some embodiments the compositions have an epoxy resin solids content of at least 70 weight percent, based on total weight of the composition. This includes compositions having an epoxy resin solids content of at least 75 weight percent, at least 80 weight percent and at least 85 weight percent, based on the total weight of the composition. For example, some of the present compositions have an epoxy resin content of 70 to 85 weight percent. This includes compositions having an epoxy resin content of 75 to 85 weight percent and further includes compositions having an epoxy resin content of 80 to 85 weight percent.

The epoxy resin solids content can be measured by heating a sample of epoxy resin in aluminum pan on a hot plate maintained at 171° C. for one hour to remove any solvents that may be present in the sample and then allowing the sample to cool to room temperature. The % (wt/wt) volatiles are calculated from the weight lost during the heating period. To insure accuracy multiple samples (e.g., three) are measured.

Solvent Blend:

The storage stability and viscosity of the compositions are functions of both the ratio of MEK to PMA in the solvent blend and the solids content. In general, to maintain a given level of storage stability, the optimal ratio of MEK to PMA increases for higher solids content compositions. Thus, in various embodiments, the solvent blend has a weight ratio of MEK to PMA of 1:1.5 to 1:9. This includes embodiments in which the solvent blend has a weight ratio of MEK to PMA of 1:3 to 1:9 and further includes embodiments in which the solvent blend has a weight ratio of MEK to PMA of 1:4 to 1:9.

In some specific embodiments, the composition has an epoxy solids content of at least 80 weight percent and the solvent blend comprises no greater than 40 weight percent MEK and at least 60 weight percent PMA, the composition having a storage stability (as described below) of at least 60 days at 21° C. This includes embodiments in which the composition has an epoxy solids content of at least 80 weight percent and the solvent blend comprises no greater than 20 weight percent MEK and at least 80 weight percent PMA, the composition having a storage stability of at least 200 days at 21° C. Also included are embodiments in which the composition has an epoxy solids content of at least 85 weight percent and the solvent blend comprises no greater than 40 weight percent MEK and at least 60 weight percent PMA, the composition having a storage stability of at least 200 days at 21° C.

In other specific embodiments, the composition has an epoxy solids content of at least 70 weight percent and the solvent blend comprises no greater than 20 weight percent MEK and at least than 80 weight percent PMA, the composition having a storage stability of at least 130 days at 21° C. This includes embodiments in which the composition has an epoxy solids content of at least 75 weight percent and the solvent blend comprises no greater than 20 weight percent MEK and at least 80 weight percent PMA, the composition having a storage stability of at least 150 days at 21° C.

The solvent blend will typically account for 5 to 30 weight percent (e.g., 10 to 30 or 15 to 30 weight percent) of the composition.

Storage Stability:

For the purposes of this disclosure storage stability is defined as a solution's ability to maintain homogeneity for a minimum specified time at a prescribed temperature or within a range of temperatures. Storage stability can be measured by preparing 60 gram composition samples by accurately measuring the appropriate combination of resins and solvents. After all solid components of the resin are dissolved into the solution, three ~15 gram aliquots can be separated into 20 gram clear glass vials and sealed. Each aliquot is labeled and then exposed to a specific temperature (e.g., 37° C., 21° C., or 3.3° C.). Periodically, samples are removed from their temperature controlled environment and visually inspected for precipitate and clarity of solution. The small glass vials made it easy to detect failure. Failure was defined as any visible precipitate or haze in the solution compared to a vial containing only solvent. The sample vials are not opened during the study to maintain constant solvent level.

For many situations, maximizing long-term storage stability is important, while a somewhat shorter period of storage stability may be acceptable in other situations. As illustrated by the examples below, the present compositions can be designed to provide storage stability for varying lengths of time. For example, some embodiments of the compositions have a storage stability at 21° C. of at least 60 days. This includes compositions having a storage stability at 21° C. of at least 80, at least 100, at least 120, at least 140, at least 160, at least 180 and at least 200 days. These storage stability levels can be achieved without the addition of stabilizing agents.

Varnishes:

The curable resin composition used to impregnate a porous reinforcement during pre-preg fabrication, known as a varnish, can be an epoxy resin composition of the type described herein, further comprising one or more curing agents and, optionally, one or more curing catalysts.

The curing agent (also known as a crosslinker or hardener, is a compound having at least one group capable of reacting with the epoxy groups of the epoxy resins in the epoxy resin component. Suitable curing agents include, for example, amine-curing agents such as dicyandiamide, diaminodiphenylmethane and diaminodiphenylsulfone; anhydrides such as hexahydroxyphthalic anhydride and styrene-maleic anhydride copolymers; imidazoles; and phenolic curing agents such as phenol novolac resins; and mixtures thereof. Such curing agents can be added to the varnishes immediately before curing, or can be included in the varnish from the beginning, if they are latent. The ratio of curing agent to epoxy resin should be suitable to provide a fully cured resin. The amount of curing agent which may be present can vary depending upon the particular curing agent used (due to the cure chemistry and curing agent equivalent weight). The amount of the curing agents used can range, for example, from about 0.3 to about 1.5 equivalent per epoxy equivalent of the epoxy resin component.

The curing catalysts (also referred to as curing accelerators or cure activators) catalyze the reaction of the epoxy groups of the epoxy resins and the curing agents. Such catalysts include nitrogen-containing compounds. The nitrogen-containing compounds can act with the curing agents to form an infusible reaction product between the curing agents and the epoxy resin in a final article of manufacture such as a structural composite or laminate. By an infusible reaction product, it is meant that the epoxy resin has essentially completely cured, which for example may be at a time when there is little or no change between two consecutive $T_g$ measurements ($\Delta T_g$).

In one embodiment, the nitrogen-containing compound is a heterocyclic nitrogen compound, an amine or an ammonium compound. The nitrogen-containing catalyst compound can be an imidazole, a derivative of an imidazole, or mixtures thereof. Examples of suitable imidazoles include 2-methylimidazole (2-MI), 2-phenylimidazole (2-PI), 2-ethyl-4-methyl imidazole, and combinations thereof. Examples of suitable catalyst compounds also include those compounds listed in European Patent Specification EP 0 954 553 B1.

Other known general classes of curing catalyst compounds include, but are not limited to phosphine compounds, phosphonium salts, imidazolium salts, ammonium salts, and diazabicyclo compounds as well as their tetraphenylborates salts, phenol salts and phenol novolac salts.

The amount of curing catalyst utilized in the epoxy resin compositions is an amount effective to catalyze the reaction of the epoxy resin with the curing agent. The amount of catalyst to be utilized depends upon the components utilized in the composition, the processing requirements, and the performance targets of the articles to be manufactured. In one embodiment, the amount of curing catalyst is from 0.001 percent to less than 10 percent by weight to the epoxy resin (based on solids). This includes varnishes having from 0.01 percent to 5 percent by weight curing catalyst (based on solids), and further includes varnishes having from 0.02 percent to 2 percent by weight curing catalyst (based on solids).

The components of the varnishes can be mixed together in any order. For example, a first composition comprising the epoxy resin in the solvent blend can be mixed with a second composition comprising curing agents and/or curing catalysts. All other components, including additives, can be present in the same composition, or some may be present in the first, and some in the second.

Other Additives and Solvents:

Optionally, the epoxy resin compositions of the present invention may further contain other components typically used in an epoxy resin composition particularly for making pre-pregs and laminates; and which do not detrimentally affect the properties or performance of the composition, or the final cured product made therefrom. For example, other optional components useful in the compositions include toughening agents; curing inhibitors; fillers; wetting agents; colorants; flame retardants; solvents; thermoplastics; processing aids; fluorescent compounds; such as tetraphenolethane (TPE) or derivatives thereof; UV blocking compounds; and other additives. The compositions of the present invention can also include other optional constituents such as inorganic fillers and other such constituents including, but not limited to, dyes, pigments, surfactants, flow control agents, and plasticizers.

In some embodiments, the compositions include sufficient amounts of brominated epoxy resin and/or other flame retardants to render laminates made from the compositions flame retardant under the UL-94 V-0, V-1, or V-2 tests. "UL-94" is the Underwriters' Laboratory (UL) Bulletin 94 Tests for Flammability of Plastic Materials for Parts in Devices and Appliances. The material tested is UL 94 V-0 classified if:

None of the five test specimens burn for over 10 seconds at any time when the burner flame is removed.
The total burning time of the 10 ignition test does not exceed 50 seconds.
No test specimen burns either with a flame or afterglow to the clamp.
No burning drops should fall which would cause the cotton underneath to ignite from any test specimen.
The afterglow burning of no test specimen exceeds 30 seconds.

The material tested is UL 94 V-1 classified if:
None of the five test specimens burn for over 30 seconds at any time when the burner flame is removed.
The total burning time of the 10 ignition test does not exceed 250 seconds.
No test specimen burns either with a flame or afterglow to the clamp.
No burning drops should fall which would cause the cotton underneath to ignite from any test specimen.
The afterglow burning of no test specimen exceeds 60 seconds.

The material tested is UL 94 V-2 classified if:
None of the five test specimens burn for over 30 seconds at any time when the burner flame is removed.
The total burning time of the 10 ignition test does not exceed 250 seconds.
No test specimen burns either with a flame or afterglow to the clamp.
Only such burning pieces may fall from the test specimen, which burn only momentarily, and of which some ignite the cotton underneath.
The afterglow burning of no test specimen exceeds 60 seconds.

Viscosity:

The viscosity of the epoxy resin compositions, including varnishes for use in the formation of pre-pregs and electrical laminates (as described below) is desirably low enough to allow the compositions to be pumped and to allow the compositions to wet fibrous reinforcing materials. Thus, in some embodiments, the composition has a viscosity of no greater than 4000 cPs at a temperature of 25° C. This includes compositions having a viscosity of no greater than 3000 cPs at a temperature of 25° C., further includes compositions having a viscosity of no greater than 2000 cPs at a temperature of 25° C., and still further includes compositions having a viscosity of no greater than 1000 cPs at a temperature of 25° C.

For the purposes of this disclosure, viscosity is measured by the standard test method described in ASTM D445. The method measures the time for a specific volume of liquid, flowing under gravity at a specified temperature, through a calibrated glass capillary viscometer. The resultant value is called the kinematic viscosity and, when multiplied by the density of the liquid, results in the dynamic viscosity.

Pre-Pregs and Laminates:

Another aspect of the invention provides pre-pregs and composites made from the present epoxy resin compositions.

The term "pre-preg" refers to a composite of a porous reinforcement impregnated with a curable resin composition, such as the epoxy resin compositions described herein. Impregnation of the porous reinforcement can be carried out by a variety of methods, including, immersing the porous reinforcement in a curable resin composition, spraying the porous reinforcement with a curable resin composition, exposing the porous reinforcement to a stream of a curable resin composition and vacuum infiltrating the porous reinforcement with a curable resin composition. Following impregnation, any excess resin composition on the porous reinforcement is allowed to drain off, or is otherwise removed, to provide the "pre-preg". Examples of porous reinforcements from which pre-pregs can be fabricated include fibrous materials such as fibers, woven cloth, fiber mesh, fiber mats, and unwoven aramid reinforcements such as those sold under the trademark THERMOUNT, available from DuPont, Wilmington, Del. Such materials can be made, for example, from glass, fiberglass, quartz, paper, which may be cellulosic or synthetic, a thermoplastic resin substrate such as aramid reinforcements, polyethylene, poly(p-phenyleneterephthalamide), polyester, polytetrafluoroethylene and poly(p-phenylenebenzobisthiazole), syndiotatic polystyrene, carbon, graphite, ceramic or metal.

The term "B-stage pre-preg" refers to a pre-preg that has undergone processing at elevated temperatures, such that the pre-preg has undergone a partial cure.

The term "epoxy pre-preg" means a pre-preg made from a composite of a porous reinforcement impregnated with an epoxy resin composition.

The term "laminate" refers to an article made by pressing together, under elevated temperatures and pressures, the multiple layers of a multi-layered structure that includes at least one layer of pre-preg, such that the layer(s) of pre-preg are completely or essentially completely cured. An "electrical laminate" refers to a laminate in which one of the layers comprises an electrically conductive material, such as a metal foil.

A laminate can be made by contacting a porous reinforcing material with an epoxy resin composition under conditions such that the reinforcing material is coated with the resin composition. Thereafter the coated reinforcing materials can be heated to a temperature sufficient to cause the solvents to evaporate, but below the temperature at which the resin composition undergoes significant cure during the heat exposure, although partial cure of the epoxy resin component (B-staging) can occur during heat-exposure.

One or more sheets of pre-preg can be processed into laminates, optionally with one or more sheets of electrically-conductive material such as copper. In such further processing, one or more segments or parts of the coated reinforcing material are brought in contact with one another and/or the conductive material. Thereafter, the contacted parts are exposed to elevated pressures and temperatures sufficient to cause the epoxy resin to cure wherein the resin on adjacent parts react to form an epoxy resin matrix. Before being cured the parts can be cut and stacked or folded and stacked into a part of desired shape and thickness. In some embodiments it is desirable to subject the laminate or final product to a post cure outside of a press. This step is designed to complete the curing reaction. This post cure step may be performed in a vacuum to remove any unwanted volatile components.

EXAMPLES

Materials

The epoxy resins used in the epoxy resin component are D.E.R. 560 and D.E.N. 438, both available from The Dow Chemical Company. D.E.R. is a highly brominated epoxy, which is a diglycidyl ether of tetrabromobisphenol A advanced with tetrabromobisphenol A to an epoxy equivalent weight (EEW) of 440 to 470 and a bromine content of 47 to 51 weight percent. D.E.N. 438 is a phenol-formaldehyde epoxy novolac with an EEW of 176 to 181 and a functionality of 3.6.

The solvents used in the solvent blend are MEK and Dowanol PMA available from The Dow Chemical Company.

Methods:

Quantities of 51.7 kg of D.E.R. 560 epoxy resin and 51.7 kg of D.E.N. 438 epoxy resin are heated in a mixed pressure vessel at 120° C., which is above the melting point of both resins but below the boiling point of DOWANOL PMA (146° C.). Once molten and mixed, enough Dowanol PMA is added to bring the PMA content up to 17.0 kg. The temperature is then reduced below the boiling point of MEK (80° C.). Enough MEK is then added to bring the MEK content up to 5.7 kg. The resulting solution is allowed to cool to room temperature and mixed for an additional 0.5 to 1 hours. A sample is then taken to make a visual observation that the resins have dissolved. If the sample appears to be dissolved it is then analyzed to confirm that all of the epoxy resin solids have dissolved. In order to measure solids content, the sample of epoxy resin is heated in an aluminum pan on a hot plate maintained at 171° C. for one hour to remove any solvents that may be present in the sample and then is allowed to cool. The % (wt/wt) volatiles are calculated from the weight lost during the heating period. To insure accuracy multiple samples are measured. The product is then filtered through a 25 micron filter into a 55 gallon drum.

The resulting epoxy resin composition had an epoxy solids content of 82.5 weight percent, a room temperature viscosity of 3506 cPs and an EEW of 263.

Other epoxy resin compositions having different epoxy resin solids contents and different MEK:PMA ratios were produced using the same methods.

Results:

The storage stability of each of the compositions was measured over a period of time, until the composition failed or until 219 days had passed. The storage stability was measured at three temperatures: 37° C., 21° C. and 3.3° C. The results of the storage stability measurements are presented in Table 1. Viscosity measurements for certain compositions at 25° C. are shown in Table 2. F indicates failure meaning visible precipitate was evident in the glass sample bottle. A nv designation indicates there was no visible precipitate observed.

TABLE 1

| Total Epoxy Resin Solids (wt. %) | Solvent Blend (wt. % in blend) | | 35 days Temp. (° C.) | | | 56 days Temp. (° C.) | | | 63 days Temp. (° C.) | | | 84 days Temp. (° C.) | | | 105 days Temp. (° C.) | | |
|---|---|---|---|---|---|---|---|---|---|---|---|---|---|---|---|---|---|
| | MEK | DPMA | 37 | 21 | 3.3 | 37 | 21 | 3.3 | 37 | 21 | 3.3 | 37 | 21 | 3.3 | 37 | 21 | 3.3 |
| 85% | 80% | 20% | nv | nv | nv | nv | nv | nv | nv | nv | nv | nv | nv | nv | nv | F | nv |
| 85% | 60% | 40% | nv | nv | nv | nv | nv | nv | nv | nv | nv | nv | nv | nv | nv | nv | nv |
| 85% | 40% | 60% | nv | nv | nv | nv | nv | nv | nv | nv | nv | nv | nv | nv | nv | nv | nv |
| 85% | 20% | 80% | nv | nv | nv | nv | nv | nv | nv | nv | nv | nv | nv | nv | nv | nv | nv |
| 80% | 80% | 20% | F | F | F | F | F | F | F | F | F | F | F | F | F | F | F |
| 80% | 60% | 40% | nv | F | nv | F | F | nv | F | F | nv | F | F | nv | F | F | F |
| 80% | 40% | 60% | nv | nv | nv | nv | nv | nv | nv | nv | nv | nv | F | nv | nv | F | nv |
| 80% | 20% | 80% | nv | nv | nv | nv | nv | nv | nv | nv | nv | nv | nv | nv | nv | nv | nv |
| 80% | 0% | 100% | nv | nv | nv | nv | nv | nv | nv | nv | nv | nv | nv | nv | nv | nv | nv |
| 75% | 80% | 20% | F | F | F | F | F | F | F | F | F | F | F | F | F | F | F |
| 75% | 60% | 40% | nv | F | F | F | F | F | F | F | F | F | F | F | F | F | F |
| 75% | 40% | 60% | nv | nv | nv | nv | F | nv | nv | F | nv | nv | F | nv | nv | F | nv |

TABLE 1-continued

| Total Epoxy Resin Solids (wt. %) | Solvent Blend (wt. % in blend) | | 114 Temp. (° C.) | | | 133 Temp. (° C.) | | | 161 Temp. (° C.) | | | 219 Temp. (° C.) | | |
|---|---|---|---|---|---|---|---|---|---|---|---|---|---|---|
| | MEK | DPMA | 37 | 21 | 3.3 | 37 | 21 | 3.3 | 37 | 21 | 3.3 | 37 | 21 | 3.3 |
| 75% | 20% | 80% | nv | nv | nv | nv | nv | nv | nv | nv | nv | nv | nv | nv |
| 75% | 0% | 100% | nv | nv | nv | nv | nv | nv | nv | nv | nv | nv | nv | nv |
| 70% | 100% | 0% | — | — | — | — | — | — | — | — | — | — | — | — |
| 70% | 80% | 20% | F | F | F | F | F | F | F | F | F | F | F | F |
| 70% | 60% | 40% | nv | F | F | F | F | F | F | F | F | F | F | F |
| 70% | 40% | 60% | nv | F | nv | nv | F | nv | nv | F | F | nv | F | F |
| 70% | 20% | 80% | nv | nv | nv | nv | nv | nv | nv | nv | nv | nv | nv | nv |
| 70% | 0% | 100% | nv | nv | nv | nv | nv | nv | nv | nv | nv | nv | nv | nv |
| 85% | 80% | 20% | nv | F | nv | nv | F | nv | nv | F | nv | F | F | F |
| 85% | 60% | 40% | nv | nv | nv | nv | nv | nv | nv | nv | nv | F | F | nv |
| 85% | 40% | 60% | nv | nv | nv | nv | nv | nv | nv | nv | nv | nv | nv | nv |
| 85% | 20% | 80% | nv | nv | nv | nv | nv | nv | nv | nv | nv | nv | nv | nv |
| 80% | 80% | 20% | F | F | F | F | F | F | F | F | F | F | F | F |
| 80% | 60% | 40% | F | F | F | F | F | F | F | F | F | F | F | F |
| 80% | 40% | 60% | nv | F | nv | nv | F | nv | nv | F | nv | F | F | F |
| 80% | 20% | 80% | nv | nv | nv | nv | nv | nv | nv | nv | nv | nv | nv | nv |
| 80% | 0% | 100% | nv | nv | nv | nv | nv | nv | nv | nv | nv | nv | nv | nv |
| 75% | 80% | 20% | F | F | F | F | F | F | F | F | F | F | F | F |
| 75% | 60% | 40% | F | F | F | F | F | F | F | F | F | F | F | F |
| 75% | 40% | 60% | nv | F | nv | F | F | F | F | F | F | F | F | F |
| 75% | 20% | 80% | nv | nv | nv | nv | nv | nv | nv | nv | nv | nv | F | nv |
| 75% | 0% | 100% | nv | nv | nv | nv | nv | nv | nv | nv | nv | nv | nv | nv |
| 70% | 100% | 0% | — | — | — | — | — | — | — | — | — | — | — | — |
| 70% | 80% | 20% | F | F | F | F | F | F | F | F | F | F | F | F |
| 70% | 60% | 40% | F | F | F | F | F | F | F | F | F | F | F | F |
| 70% | 40% | 60% | nv | F | F | F | F | F | F | F | F | F | F | F |
| 70% | 20% | 80% | nv | nv | nv | nv | nv | nv | nv | F | nv | F | F | F |
| 70% | 0% | 100% | nv | nv | nv | nv | nv | nv | nv | nv | nv | nv | nv | nv |

TABLE 2

| wt. % Epoxy Resin Solids | MEK/PMA Ratio | Viscosity cPs @ 25 C. |
|---|---|---|
| 80 | 40/60 | 819 |
| 82 | 40/60 | 1664 |
| 82 | 25/75 | 3300 |
| 85 | 50/50 | 3480 |
| 85 | 40/60 | 4143 |

From the results in Tables 1 and 2, it can be seen that the use of MEK and PMA in the proper ratio can provide epoxy resin compositions having long-term storage stability, high solids content and low viscosities.

DEFINITIONS

"Polymer" means a polymeric compound prepared by polymerizing monomers, whether of the same or a different type. The generic term polymer thus embraces the term homopolymer, usually employed to refer to polymers prepared from only one type of monomer, and also embraces the term interpolymer. "Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Composition", "formulation" and like terms means a mixture or blend of two or more components. In the context of a mix or blend of materials from which a pre-preg or other article of manufacture is fabricated, the composition includes all the components of the mix.

The term "comprising" and its derivatives are not intended to exclude the presence of any additional component, step or procedure, whether or not the same is specifically disclosed. In order to avoid any doubt, any process or composition claimed through use of the term "comprising" may include any additional steps, equipment, additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

Numerical ranges include all values from and including the lower and the upper values, in increments of one unit, provided that there is a separation of at least two units between any lower value and any higher value. As an example, if a compositional, physical or other property, such as, for example, viscosity, storage stability, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of epoxy resin, solvents, curing agents and additives in the composition, and the various characteristics and properties by which these components are defined.

As used with respect to a chemical compound, unless specifically indicated otherwise, the singular includes all isomeric forms and vice versa.

Although the invention has been described in considerable detail through the preceding description and examples, this detail is for the purpose of illustration. One skilled in the art can make many variations and modifications without departing from the spirit and scope of the invention as described in the appended claims.

What is claimed is:

1. An epoxy resin composition comprising:
   (a) an epoxy resin component comprising at least one epoxy resin; and
   (b) a solvent blend comprising methyl ethyl ketone in an amount of no greater than 20 weight percent and propylene glycol methyl ether acetate in an amount of at least 80 weight percent, based on the total weight of the solvent blend such that the weight ratio of methyl ethyl ketone to propylene glycol methyl ether acetate is of 1:4 to 1:9;
   the composition having an epoxy resin solids content of at least 70 weight percent and a solvent blend content of 5 to 30 weight percent, based on the total weight of the composition and a storage stability of at least 130 days at 21° C.

2. The composition of claim 1, in which the epoxy resin component comprises a brominated epoxy resin and a phenolic novolac epoxy resin.

3. The composition of claim 1, in which the solvent blend comprises 85 weight percent propylene glycol methyl ether acetate and 15 weight percent methyl ethyl ketone.

4. The composition of claim 3 having an epoxy resin solids content of at least 80 weight percent, based on the total weight of the composition.

5. The composition of claim 1 having an epoxy resin solids content of at least 75 weight percent, based on the total weight of the composition, and a storage stability of at least 150 days at 21° C., the solvent blend comprising no greater than 20 weight percent methyl ether ketone and at least 80 weight percent propylene glycol methyl ether acetate.

6. The composition of claim 1 having an epoxy resin solids content of at least 85 weight percent, based on the total weight of the composition, and a storage stability of at least 200 days at 21° C.

7. The composition of claim 1, having an epoxy resin solids content of at least 85 weight percent, based on the total weight of the composition, and a storage stability of at least 200 days at 21° C., the solvent blend comprising 85 weight percent propylene glycol methyl ether acetate and 15 weight percent methyl ethyl ketone.

8. A varnish comprising:
   (a) a curing agent;
   (b) a curing catalyst; and
   (c) the epoxy resin composition of claim 1.

9. The varnish of claim 8 having a viscosity of no greater than 4 Pa*s at 25° C.

10. A method of forming a composite, the method comprising impregnating a porous reinforcement material with a varnish comprising:
    (a) a curing agent;
    (b) a curing catalyst; and
    (c) an epoxy resin composition,
    wherein the epoxy resin composition comprises:
    (i) an epoxy resin component comprising at least one epoxy resin; and
    (ii) a solvent blend comprising methyl ethyl ketone in an amount of no greater than 20 weight percent and propylene glycol methyl ether acetate in an amount of at least 80 weight percent, based on the total weight of the solvent blend such that the weight ratio of methyl ethyl ketone to propylene glycol methyl ether acetate is of 1:4 to 1:9;
    the composition having an epoxy resin solids content of at least 70 weight percent and a solvent blend content of 5 to 30 weight percent, based on the total weight of the composition and a storage stability of at least 130 days at 21° C.; and
    at least partially curing the impregnated fibrous reinforcement material.

* * * * *